US012675665B2

(12) United States Patent
Becker

(10) Patent No.: US 12,675,665 B2
(45) Date of Patent: Jul. 7, 2026

(54) CHOKE FOR WIRELESS TAGS

(71) Applicant: Wiliot, Ltd., Caesarea (IL)

(72) Inventor: Oleg Becker, Holon (IL)

(73) Assignee: Wiliot, Ltd., Caesarea (IL)

( * ) Notice: Subject to any disclaimer, the term of this patent is extended or adjusted under 35 U.S.C. 154(b) by 381 days.

(21) Appl. No.: 17/823,303

(22) Filed: Aug. 30, 2022

(65) Prior Publication Data

US 2023/0252261 A1     Aug. 10, 2023

Related U.S. Application Data

(60) Provisional application No. 63/308,324, filed on Feb. 9, 2022.

(51) Int. Cl.
*G06K 19/077* (2006.01)
*G06K 19/07* (2006.01)

(52) U.S. Cl.
CPC ... *G06K 19/07771* (2013.01); *G06K 19/0723* (2013.01); *G06K 19/07773* (2013.01)

(58) Field of Classification Search
CPC ......... G06K 19/07771; G06K 19/0723; G06K 19/07773

USPC .......................................................... 235/492
See application file for complete search history.

(56) References Cited

U.S. PATENT DOCUMENTS

| | | | | |
|---|---|---|---|---|
| 4,682,223 A | * | 7/1987 | Ragan | G07F 17/0014 |
| | | | | 235/487 |
| 10,644,378 B1 | * | 5/2020 | Lu | H03F 3/19 |
| 10,764,096 B1 | * | 9/2020 | Nai | H04L 27/08 |
| 2015/0201459 A1 | * | 7/2015 | Sato | H04B 5/26 |
| | | | | 235/492 |
| 2016/0328637 A1 | * | 11/2016 | Viikari | G06K 19/0717 |

* cited by examiner

*Primary Examiner* — Michael G Lee
*Assistant Examiner* — David Tardif
(74) *Attorney, Agent, or Firm* — M&B IP Analysts, LLC

(57) ABSTRACT

A wireless tag comprises a chip; an antenna; at least one conductive structure, the conductive structure and the chip being coupled by a common electrical connection to ground; and a filter electrically interposed along an electrical connection between the chip and the conductive structure; wherein the filter causes a reduction in amplitude of a signal passing between the conductive structure and the chip or an electrical disconnection between the conductive structure and the chip at around a prescribed frequency.

23 Claims, 6 Drawing Sheets

CHOKE FOR WIRELESS TAGS

CROSS-REFERENCE TO RELATED APPLICATIONS

This application claims benefit of U.S. provisional patent application Ser. No. 63/308,324, filed Feb. 9, 2022, which is herein incorporated by reference.

TECHNICAL FIELD

This invention relates to wireless tags, and more particularly, to reducing the interaction of various structures on the tag with the antenna.

BACKGROUND

The radio antenna pattern of battery assisted wireless tags and/or battery-less wireless tags that have relatively large metal structures that are connected to a ground that is common with a ground of an integrated circuit, i.e., chip, of the tag is influenced in a manner that is also sensitive to the tag's surrounding material. Such large metal structures include printed batteries and other ground structures. Anything that connects to the chip can interact with the antenna via such a path and so affect the performance of the antenna. Such influence is detrimental to the operation of the tag. This problem is particularly significant in structures that are on a single layer substrate as suitable for "inlay" technology.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a wireless tag. The wireless tag comprises a chip; an antenna; at least one conductive structure, the conductive structure and the chip being coupled by a common electrical connection to ground; and a filter electrically interposed along an electrical connection between the chip and the conductive structure; wherein the filter causes an electrical disconnection between the conductive structure and the chip at around a prescribed frequency.

Certain embodiments disclosed herein include a substrate for a wireless tag. The substrate for the wireless tag comprises: electrical contacts for coupling to a chip; an antenna; at least one conductive structure, the conductive structure and at least one of the electrical contacts for coupling to the chip being coupled by a common electrical connection to ground; and a filter electrically interposed along an electrical connection between the at least one of the electrical contacts for coupling to the chip and the conductive structure; wherein the filter causes an electrical disconnection between the conductive structure and the chip at around a prescribed frequency.

Certain embodiments disclosed herein include a substrate for a wireless tag. The substrate for the wireless tag comprises: a chip; an antenna; at least one conductive structure, the conductive structure and the chip being coupled by a common electrical connection to ground; and a choke electrically interposed along an electrical connection between the chip and the conductive structure; wherein the choke acts as a filter to cause a reduction in amplitude of a signal passing between the conductive structure and the chip at around a prescribed frequency.

DETAILED DESCRIPTION

Figure 1:
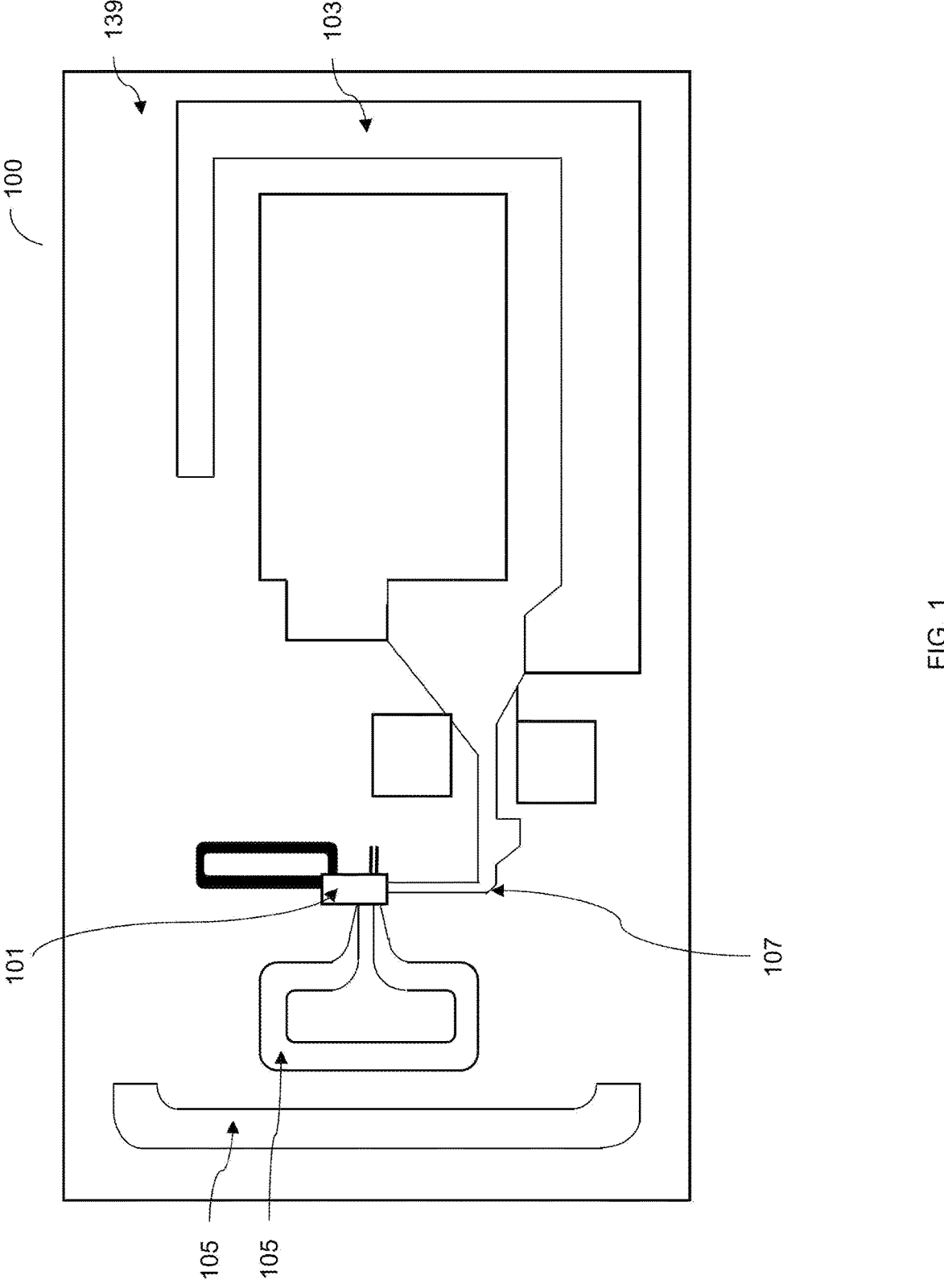
FIG. 1 shows an illustrative prior art wireless tag made up of various components.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In accordance with the principles of this disclosure, an electrical disconnection is caused, at least at certain frequencies, to occur between a wireless tag's integrated circuit, i.e., a chip, and other metal structures incorporated into the wireless tag. This is achieved, in accordance with an aspect of the disclosure, by a choke that acts as a filter, e.g., a narrowband filter, to effectively electrically disconnect the chip from the metal structure, e.g., effectively choking off a return path. In one embodiment, the choke filters return signals that exist at around the 2.4 GHz band. Such a choke may be implemented as resonator at a frequency of 2.4 GHz. Such a resonator may be the implemented, or at least modeled, as a capacitor in parallel with an inductor.

FIG. 1 shows an illustrative prior art wireless tag 100 made up of various components including, for example, a) integrated circuit 101, also referred to as IC 101 or chip 101, b) conductive structure 103, c) antenna 105, and d) connection line 107. All of the components of wireless tag 100 are mounted on substrate 139. Substrate 139 may be made of any material suitable for forming a wireless tag. Such materials are known in the art.

Chip 101 is any electrical chip suitable for use in a wireless tag. For example, chip 101 may be a controller or a microprocessor. Chip 101 may also include all memory as well as other components necessary to provide the operational functionality of chip 101. Chip 101 is coupled to antenna 105.

Antenna 105 may be any type of antenna. In one illustrative embodiment, antenna 105 may be a differential antenna with single ended ports referenced to the ground of chip 101.

Chip 101 is also coupled by way of connection line 107 to conductive structure 103. Conductive structure 103 may be made of metal or other conductive material. It may therefore be referred to as well as metal structure 103. In one embodiment, metal structure 103 is part of a printed battery (not shown) that is used at least in part to power chip 101, e.g., it is an electrode for the printed battery. Chip 101 is coupled to connection line 107 which is in turn coupled to conductive structure 103. Thus, there exists an electrical connection between chip 101 and conductive structure 103. Conductive structure 103 is connected to the same ground as is chip 101. Disadvantageously, as noted above, there is interaction between conductive structure 103, chip 101, and antenna 105.

The remaining boxes shown are part of wireless tag 100 but are not relevant to the instant disclosure.

Figure 2:
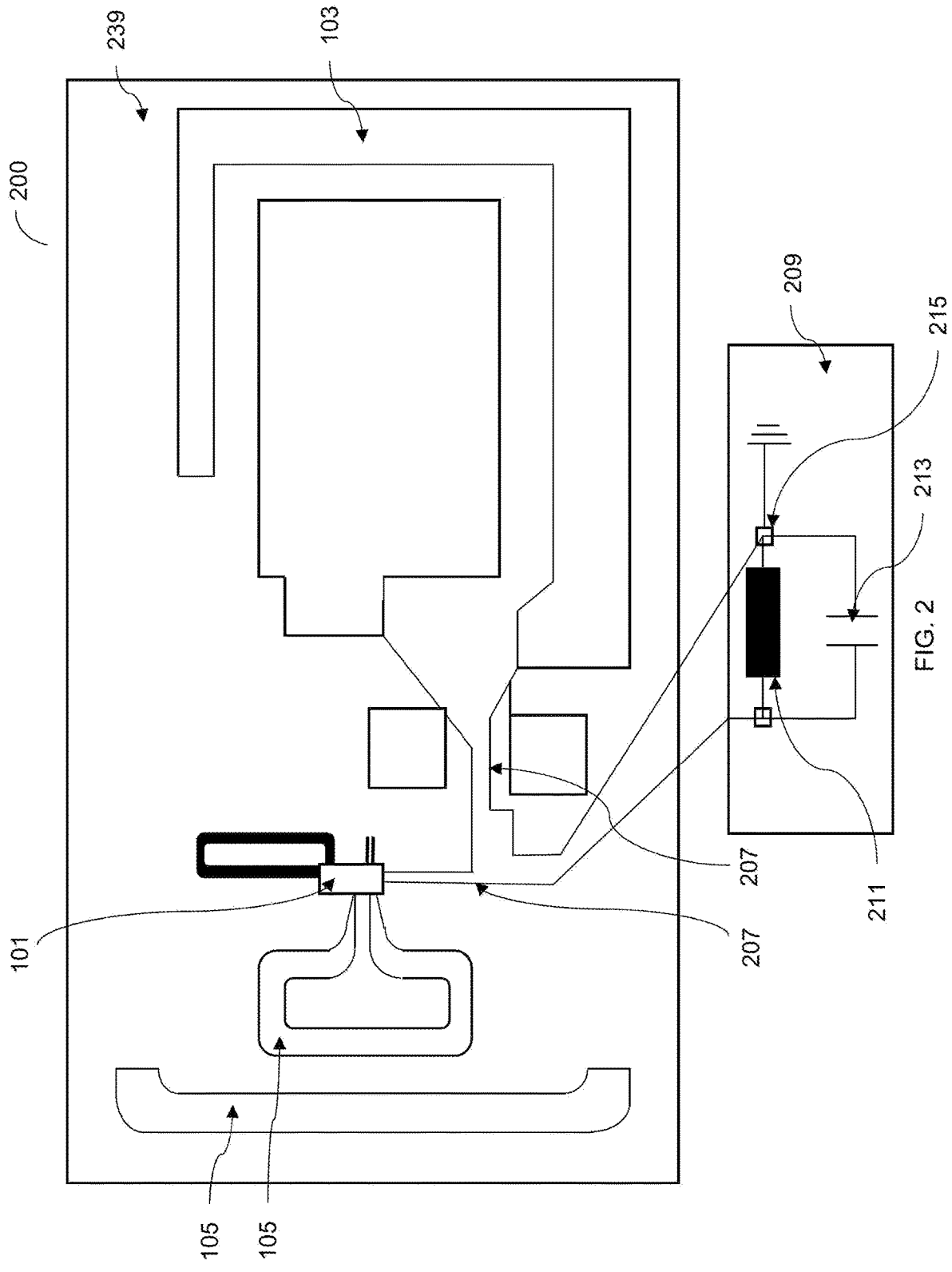
FIG. 2 shows an illustrative embodiment of a wireless tag in accordance with the principles of the disclosure.

FIG. 2 shows an illustrative embodiment of wireless tag 200 in accordance with the principles of the disclosure. Wireless tag 200 is made up of various components including, for example, several that were shown as part of prior art wireless tag 100, i.e., a) integrated circuit 101, also referred to as IC 101 or chip 101, b) conductive structure 103, and c) antenna 105. All of the components of wireless tag 100 are mounted on substrate 239 made of a suitable material for wireless tags. However, in FIG. 2 connection line 107 of FIG. 1 is replaced with connection 207 which includes along its route, i.e., connected in series with each portion of connection 207, filter 209 which acts as a choke, and hence may also be referred to as choke 209. In the illustrative embodiment shown, filter 209 comprises inductor 211 and capacitor 213 connected in parallel. Connection 207 couples chip 101 to conductive structure 103. Connection 207 is made up of two portions, which are coupled by filter 209, i.e., filter 209 bridges between the two portions of connection 207. Given that, as indicated above, conductive structure 103 is connected to ground, the point 215 at which filter 209 and connection 207 are connected is shown, for illustrative purposes only, as being connected to ground at that point. However, there need not be an independent connection to ground actually wired there since that point is connected to ground at least by virtue of conducive structure 103 being grounded.

Wireless tags often operate in the portion of the wireless spectrum allocated for industrial, scientific, and medical (ISM) applications, e.g., at 2.4 GHz. in one embodiment of a wireless tag operating at 2.4 GHz, an illustrative value for the inductance of inductor 211 is about 8.66 nH and an illustrative value for the capacitance of capacitor 213 is about 508 fF. Operationally then, advantageously, the filter acts substantially like an open circuit at about the 2.4 GHz frequency, effectively disconnecting integrated circuit 101 from conductive structure 103 and thus reducing the effect that conductive structure 103 has on integrated circuit 101 and ultimately on antenna 105. Another way to look at this is that the resonance frequency of choke 209 is set substantially at the frequency that is primarily desired to be blocked or choked off to reduce impact on the antenna. Those of ordinary skill in in the art will be able to select other values for inductor 211 and capacitor 213 suitable for applications employing different frequencies.

Figure 3:
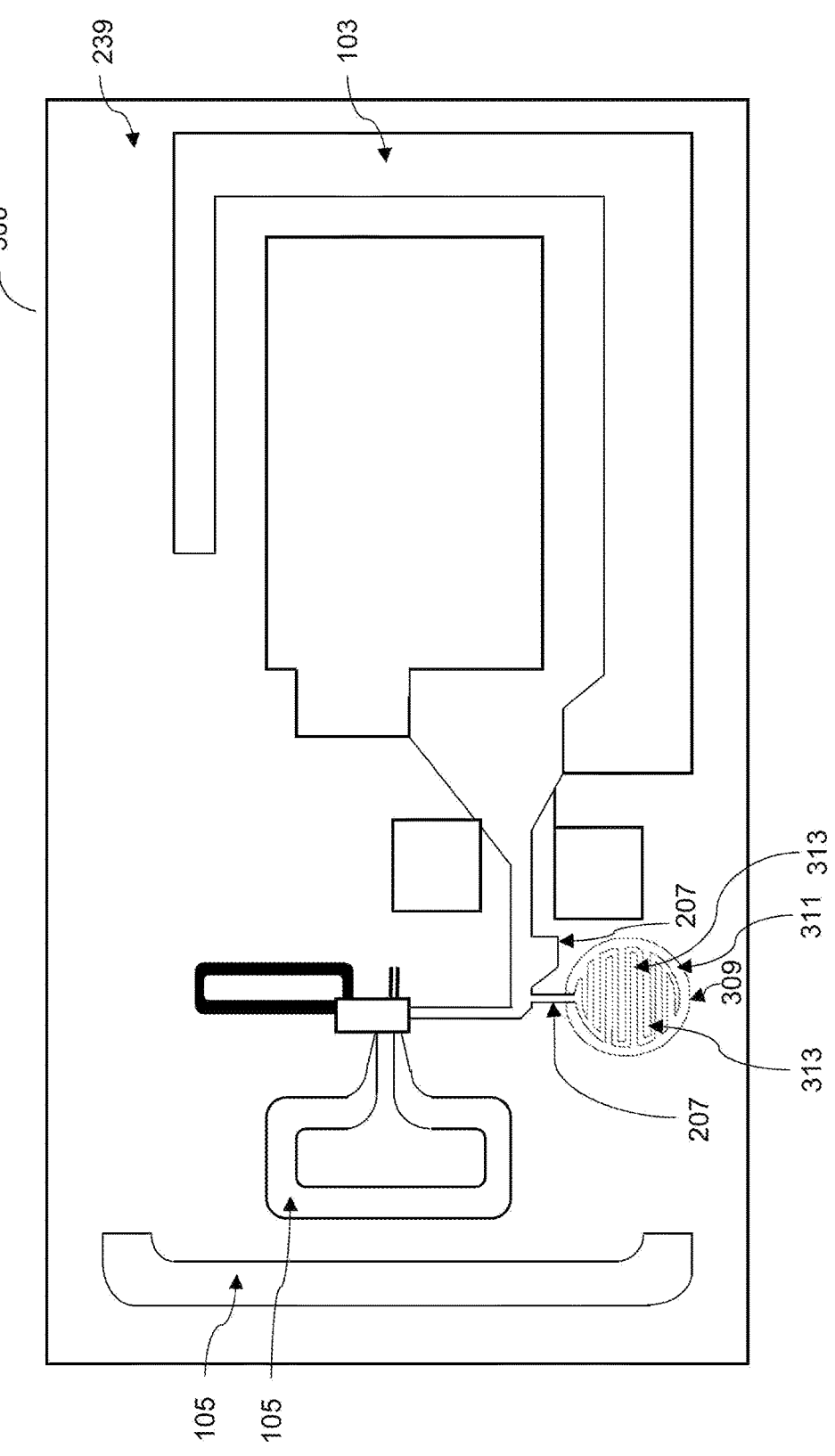
FIG. 3 shows an illustrative embodiment of the wireless tag of FIG. 2 in which a filter is implemented by a compact, single layer structure in accordance with the principles of the disclosure.
Figure 4:
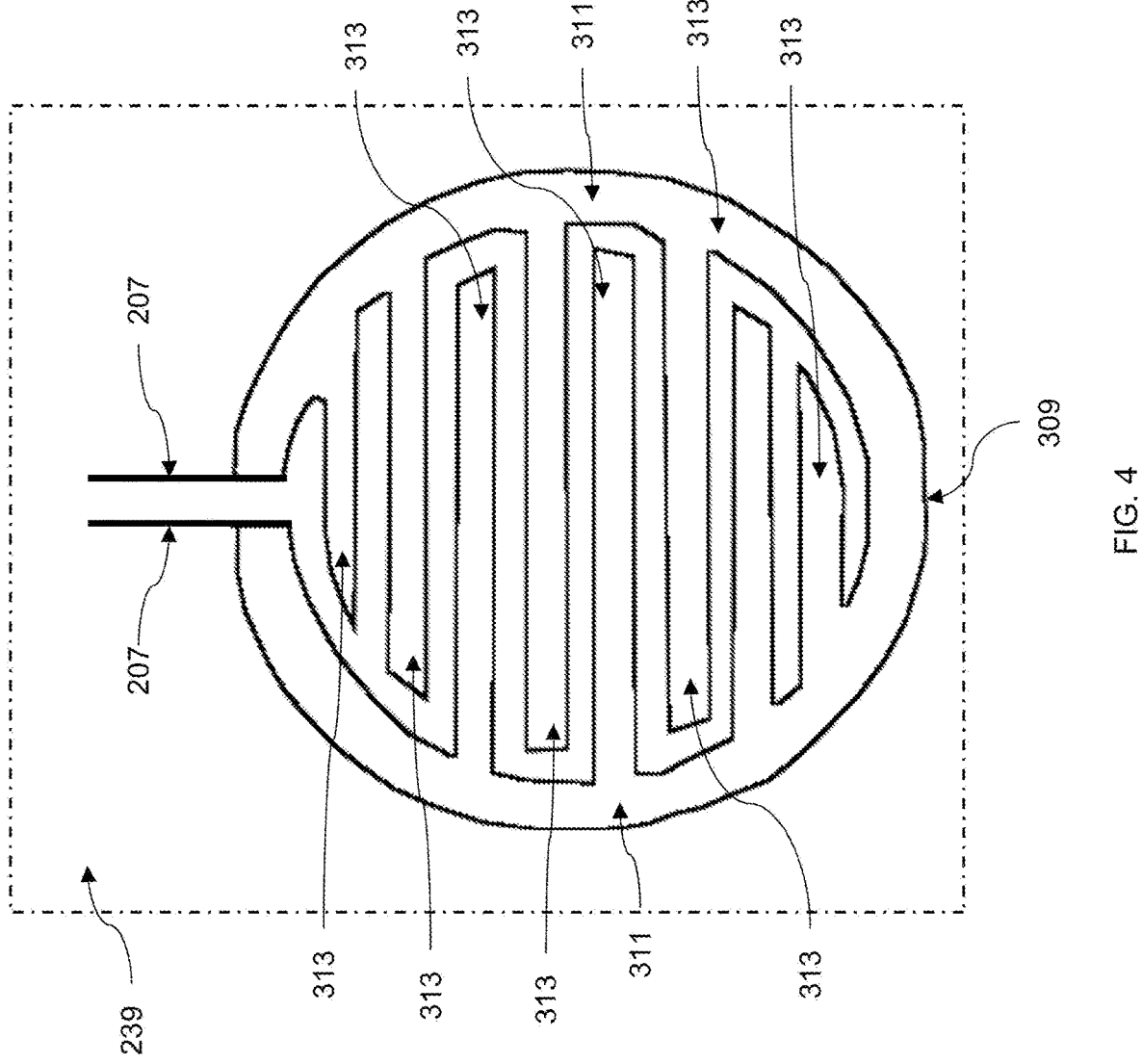
FIG. 4 shows an enlarged view of the implementation of the filter of FIG. 3.

FIG. 3 shows an illustrative embodiment of wireless tag 200, in accordance with the principles of the disclosure, in which filter 209 is implemented by a compact, single layer structure, referred to as filter 309 or choke 309. FIG. 4 shows an enlarged view of choke 309. Perimeter 311 of choke 309, i.e., the outer, circular portion thereof, primarily forms inductor 211 of filter 309 while interdigitated fingers 313 primarily form capacitor 213 of filter 309. Thus, the combined structure implements inductor 211 in parallel with capacitor 213, i.e., choke 209, but in a single layer suitable to be printed on the substrate of tag 200. Advantageously, again, choke 309 dlamps out any RF signal at its resonance frequency from grounded conductive structures, e.g., metal structure 103.

In one embodiment, for a wireless tag operating at 2.4 GHz an illustrative value for the inductance formed by perimeter 311 is about 8.66 nH and an illustrative value for the capacitance provided by fingers 313 is about 460 fF. To achieve such values the dimensions of choke 309 are as follows: diameter of perimeter 311, about 4.6 mm; width of each finger 313, about 0.3 mm; spacing between fingers 313, about 0.15 mm; width of perimeter 311, about 0.4 mm; and the gap between ends of perimeter 311, about 0.1 mm. Those of ordinary skill in the art will be able to develop an appropriately sized version for the particular resonance frequency of interest to their particular application.

Since the resonance frequency is represented as the product L*C, when it is desired to have a wide bandwidth, it is often desired to maximize the inductance rather than the capacitor, as a larger inductance can provide for better filtering. Therefore, as general design guidance, one would design for the largest inductor that can be fit within the available space, and then a corresponding capacitor that will give the desired resonance frequency in view of the designed inductor is designed, i.e., the particulars of the interdigitated fingers are then specified.

Choke 309 is formed on substrate 239 as part of the process of forming the conductors on substrate 239 during the manufacturing process.

Those of ordinary skill in the art will recognize that the values of inductance and capacitance mentioned hereinabove for filter 309 are the "lumped" value approximations, i.e., first order accuracy, resulting from the distributed inductance and capacitances of the structure shown. Because choke 309 is not an ideal lumped element, in some embodiments it may be better to design choke 309 with an offset of about −100 MHz from the resonance frequency, i.e., the frequency to be blocked.

Those of ordinary skill in the art will also recognize that direct current (DC) is able to pass from conductive structure 103 via connection 207 and through filter 309 to chip 101. Also, no charge is stored between the plates or fingers of capacitor 213, as they are kept at the same potential, i.e., they are equipotential.

Those of ordinary skill in the art will further recognize that choke 309 may be employed with other conductive structures on wireless tag that have an undesirable interaction with antenna 103. Such other conductive structures may include, for example, anti-tamper loops, test connectors, and proximity sensor pads.

It will also be appreciated by those of ordinary skill in the art that long leads, e.g., above 5 mm in length, such as may make up a capacitor or are used to connect to a discrete capacitor, which may be used to store harvested energy, may also have an impact on antenna 103 as explained hereinabove. Therefore, use of choke 309 interposed along the long leads may be advantageous. To this end, it is desire to determine a location to place choke 309 such that it will minimize the undesirable influence on the antenna yet will fit within, i.e., not require expansion of, the boundaries of wireless tag 200.

Figure 5:
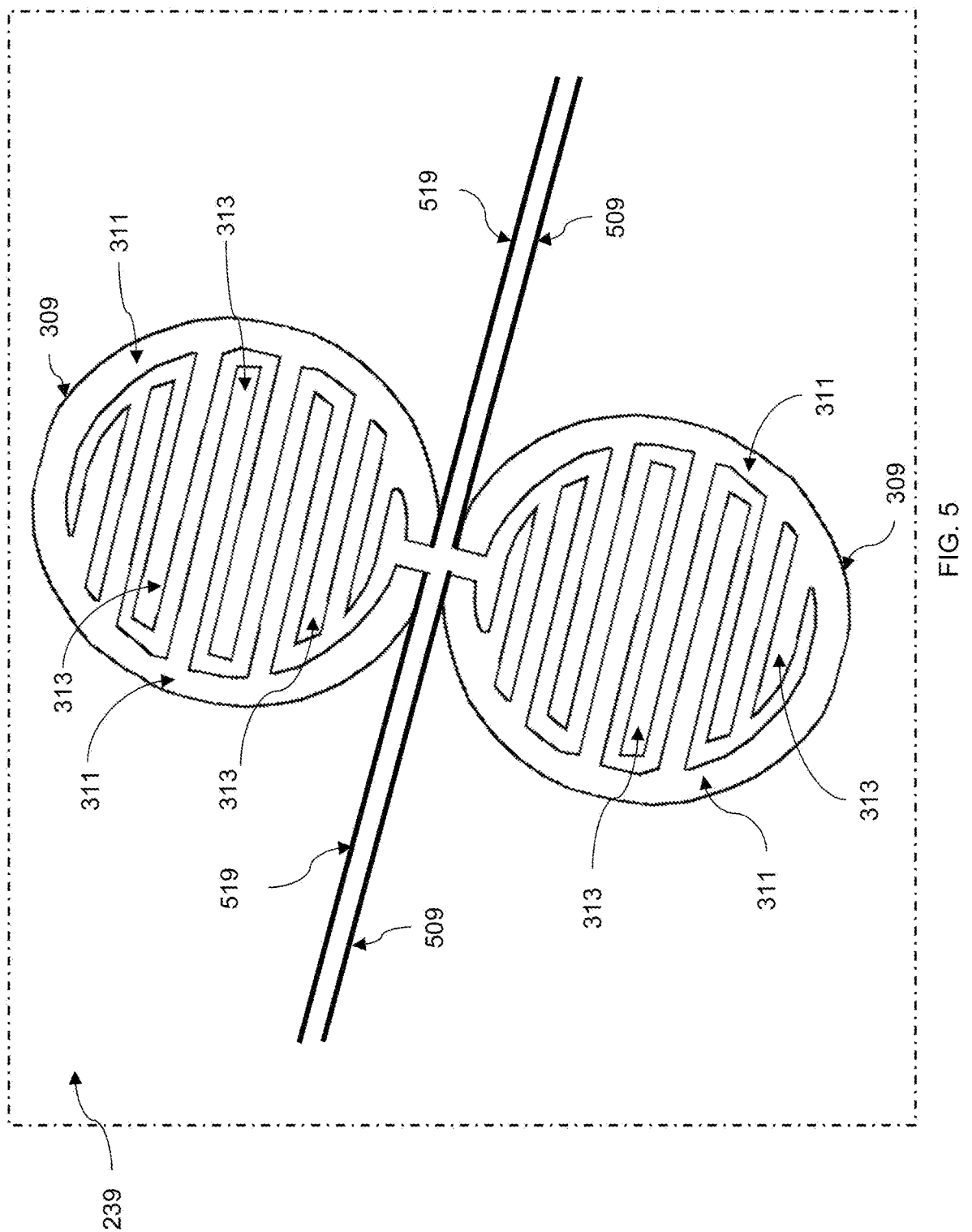
FIG. 5 shows an illustrative compact double choke design employing two adjacent chokes in accordance with the principles of the disclosure.
Figure 6:
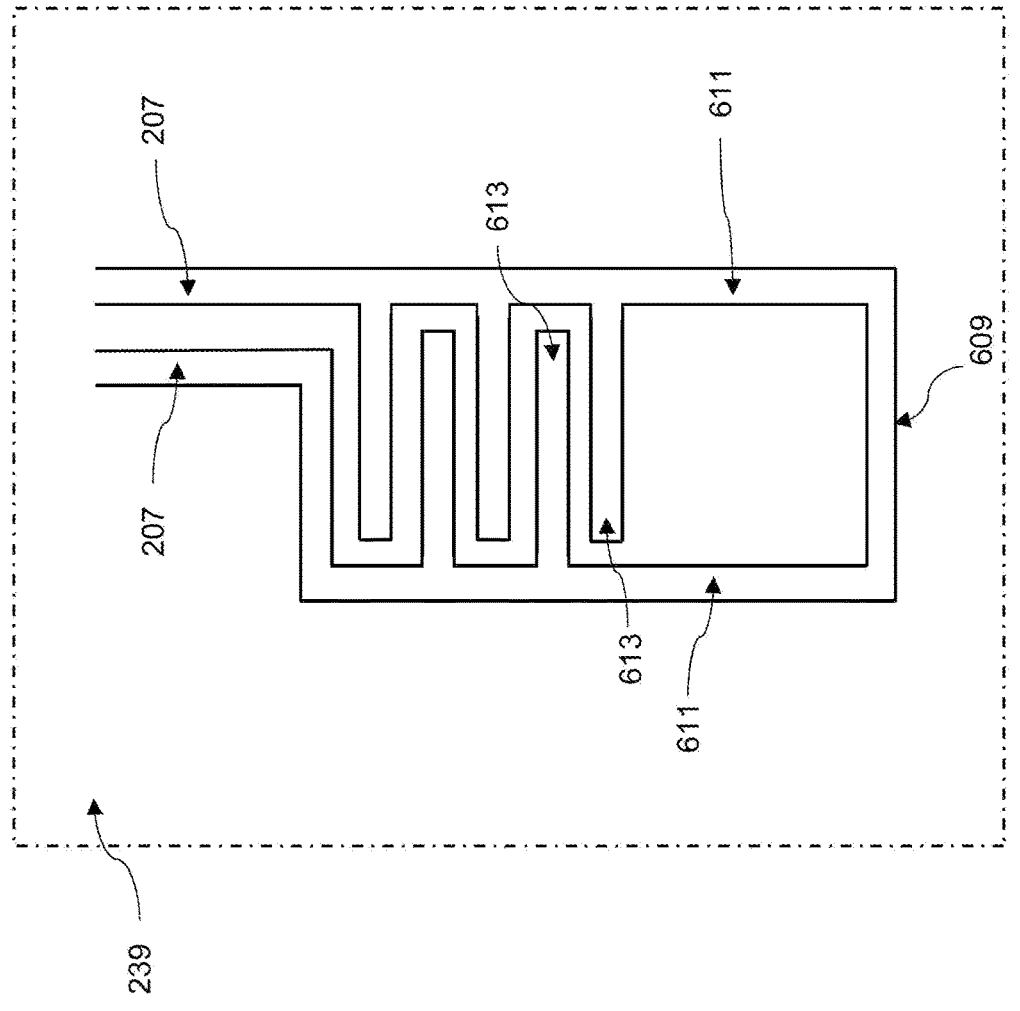
FIG. 6 shows an illustrative choke that employs a substantially rectangular shaped inductor.

In some embodiments, it may be desirable to implement a choke along each of a pair of long leads, e.g., along both the supply and the return or both plates of a capacitor. To this end, the compact double choke design shown in FIG. 5 employing two adjacent chokes 309 may be employed, in accordance with the principles of the disclosure. Those of ordinary skill in the art will recognize that the individual chokes 309 shown in FIG. 5 need not be substantially directly opposite to each other as shown in FIG. 5 but rather may be offset from each other. The precise locations may, of course, depend on the location of other components on the wireless tag 200. Any location along the long conductors may be employed. FIG. 5 also shows leads 509 and 519 which are subject to filtering by a respective one of chokes 309 which are coupled in series in the midst of their respective, associated one of leads 509 and 519. It is expected, although not required, that each respective one of leads 509 and 519 are, in totality, longer than 5 mm.

Those of ordinary skill in the art will recognize that other shapes may be employed for the choke's inductor and that the capacitor's fingers may have varying shapes, e.g., then need not be straight, parallel, or of equal width. For example, although the inductor, e.g., perimeter 311 of choke 309, is shown as being arcuate, e.g., substantially circular, in FIGS. 3 through 5, FIG. 6 shows illustrative choke 609 that employs an inductor having a substantially rectangular shaped, e.g., perimeter 611. Furthermore, in the illustrative embodiment of FIG. 6, fingers 613 that make up the capacitor of choke 609 do not extend over the entirety of the area inside of rectangular inductor 609. In other embodiments, fingers 613 that make up the capacitor of choke 609 may extend over the entirety of the area inside of rectangular inductor 609. As with the other embodiments described herein, the dimensions of perimeter 611 and the size, shape, and number of fingers 613 that make up the capacitor of the choke may be determined by the implementer based on the desired frequency that it is desired for choke 609 to block, e.g., appear to be an open circuit, as well as the area and shape available for implementing choke 609.

Other shapes for a perimeter forming the inductor may include, without limitation, oval, triangular, pentagonal, hexagonal, free shape, e.g., to make the most of an oddly shaped area, and so forth.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A wireless tag, comprising:
a chip;
an antenna;
at least one conductive structure, the conductive structure and the chip being coupled by a common electrical connection to ground; and
a filter electrically interposed along an electrical connection between the chip and the conductive structure;
wherein the filter causes an electrical disconnection between the conductive structure and the chip at around a prescribed frequency, wherein the filter comprises an inductor and a capacitor in parallel, the inductor being formed by an arcuate single layer conductor that surrounds interdigitated fingers formed of a single layer conductor that extend in an interleaved manner inward from the arcuate conductor.

2. The wireless tag of claim 1, wherein the filter operates as a choke around the prescribed frequency.

3. The wireless tag of claim 1, wherein the prescribed frequency is about 2.4 GHz.

4. The wireless tag of claim 1, wherein the filter comprises an inductor and a capacitor in parallel.

5. The wireless tag of claim 1, wherein the filter comprises an inductor and a capacitor in parallel, each of the inductor and capacitor being implemented as a single layer.

6. The wireless tag of claim 1, wherein the filter comprises an inductor and a capacitor in parallel, the inductor being formed by a substantially rectangular single layer conductor that surrounds interdigitated fingers formed of a single layer conductor that extend in an interleaved manner inward from two opposing sides of the substantially rectangular single layer conductor.

7. The wireless tag of claim 1, wherein the filter is a narrowband filter.

8. The wireless tag of claim 1, wherein the conductive structure is a layer of metal.

9. The wireless tag of claim 1, wherein the filter is connected in series along the electrical connection between the chip and the conductive structure.

10. The wireless tag of claim 1, wherein the filter comprises an inductor and a capacitor in parallel and wherein the filter is arranged to have its resonance frequency at the prescribed frequency.

11. A substrate for a wireless tag, comprising:
electrical contacts for coupling to a chip;
an antenna;
at least one conductive structure, the conductive structure and at least one of the electrical contacts for coupling to the chip being coupled by a common electrical connection to ground; and a filter electrically interposed along an electrical connection between the at least one of the electrical contacts for coupling to the chip and the conductive structure; wherein the filter causes an electrical disconnection between the conductive structure and the chip at around a prescribed frequency, wherein the filter comprises an inductor and a capacitor in parallel, the inductor being formed by an arcuate single layer conductor that surrounds interdigitated fingers formed of a single layer conductor that extend in an interleaved manner inward from the arcuate conductor.

12. The substrate for a wireless tag of claim 11, wherein the filter operates as a choke around the prescribed frequency.

13. The substrate for a wireless tag of claim 11, wherein the prescribed frequency is about 2.4 GHz.

14. The substrate for a wireless tag of claim 11, wherein the filter comprises an inductor and a capacitor in parallel.

15. The substrate for a wireless tag of claim 11, wherein the filter comprises an inductor and a capacitor in parallel, each of the inductor and capacitor being implemented as a single layer.

16. The substrate for a wireless tag of claim 11, wherein the filter comprises an inductor and a capacitor in parallel, the inductor being formed by a substantially rectangular single layer conductor that surrounds interdigitated fingers formed of a single layer conductor that extend in an interleaved manner inward from two opposing sides of the substantially rectangular single layer conductor.

17. The substrate for a wireless tag of claim 11, wherein the filter is a narrowband filter.

18. The substrate for a wireless tag of claim 11, wherein the conductive structure is a layer of metal.

19. The substrate for a wireless tag of claim 11, wherein the filter is connected in series along the electrical connection between the at least one of the electrical contacts for coupling to the chip and the conductive structure.

20. The substrate for a wireless tag of claim 11, wherein the filter comprises an inductor and a capacitor in parallel and wherein the filter is arranged to have its resonance frequency at the prescribed frequency.

21. A wireless tag, comprising:

a chip;

an antenna;

at least one conductive structure, the conductive structure and the chip being coupled by a common electrical connection to ground; and a choke electrically interposed along an electrical connection between the chip and the conductive structure;

wherein the choke acts as a filter to cause a reduction in amplitude of a signal passing between the conductive structure and the chip at around a prescribed frequency, wherein the filter comprises an inductor and a capacitor in parallel, the inductor being formed by an arcuate single layer conductor that surrounds interdigitated fingers formed of a single layer conductor that extend in an interleaved manner inward from the arcuate conductor.

22. The wireless tag of claim 21, wherein the prescribed frequency is the resonance frequency of the choke.

23. The wireless tag of claim 21, wherein the choke comprises an inductor and a capacitor in parallel, each of the inductor and capacitor being implemented as a single layer.

\* \* \* \* \*